Nov. 25, 1958  E. G. HUNT  2,861,372
METHOD OF SURFACE FINISH OF PLASTIC PANELS
Filed May 6, 1955

Inventor
ERNEST GEORGE HUNT
By Fetherstonhaugh & Co.
Attorneys

United States Patent Office 2,861,372
Patented Nov. 25, 1958

2,861,372
METHOD OF SURFACE FINISH OF PLASTIC PANELS

Ernest George Hunt, Lachine, Quebec, Canada, assignor to The Arborite Company Limited, La Salle, Quebec, Canada Application May 6, 1955, Serial No. 506,538

1 Claim. (Cl. 41—24)

This invention relates to the manufacture and surface finishing of plastic boards or panels intended for use as wall coverings and for surfacing tables, sink cabinets and other articles of furniture.

The boards or panels produced are usually built up of a multitude of prepared sheets manufactured from a resinous or other plastic material, the sheets being laid one on top of the other to give the desired thickness of panel either by themselves or in combination with a surface sheet of other plastic material. The sheets may be impregnated with a suitable thermoplastic bonding material particularly where a surface sheet of another material is used. The built up sheets are then laid between suitable materials to impart a finish such as steel, copper or aluminum commonly known as caul plates and set between the platens of a press where they are subjected to heat and pressure and cured to form a homogeneous board or panel. Normally the surface laminate of plastic has a high gloss or a satin finish, these being finishes which can be economically made from the cauls as described above without elaborate tool work being done on the cauls. However, it is frequently desired to have a semi-dull or slightly rough finish to the surface of the plastic laminate, such as would be imparted by a wire screen or a textile fabric. To finish the surface of the steel cauls to give such a semi-dull or slightly rough finish would be very costly, both in the first cost of the equipment and in future replacement of cauls particularly if any great variety of finishes were required. It is also impossible to use a wire screen or a textile fabric directly between the press platens and the surface plastic laminate as the high pressure and heat in the press would cause the screen or fabric to adhere to the plastic.

The present invention consists essentially in sandwiching a wire screen or textile fabric between two sheets of then metal foil such as aluminum, the sandwich being stitched or fastened in some like manner around the edge to hold the sandwich together and to interpose the sandwich between the platens of the press and the surface of the built up sheets which go to form the board or panel.

The object of the invention is to produce a laminated board or panel to the surface of which is imparted a semi-dull or slightly dull finish without the use of expensively finished steel platens, or caul plates.

A further object of the invention is to provide a simple and cheap method of transferring a ready made pattern to a laminated board or panel under heat and pressure and which will transfer the pattern efficiently and uniformly through a large number of press operations.

A further object of the invention is to produce a pattern transfer sandwich in which a great variety of patterns and finish can be used for transfer to a plastic surface laminate.

These and other objects will be apparent from the following detailed specification.

Referring to the drawings.

The embossing plate or sandwich is normally made up of two thin sheets of metal foil A of aluminum or other metal foil, between which is placed the pattern transferring element B. The metal foil sheets form a permanent protection for the element B while at the same time constitute an element which will not stick to the plastic surface of the panels in the press. This pattern transferring element B can be made of any suitable material which has a rough or patterned surface capable of being transferred to and through the thin sheets of metal foil A to form a mirror or duplicate pattern on the outer surface of the sandwich. Suitable materials are wire screens of a desired mesh and wire size, textile fabrics either plain or patterned and including metallic and glass fibre cloths and the like.

In the preparation of the embossing plate or sandwich, the thickness of the metal foil sheets A will depend to some extent on the type of pattern transferring element B that is to be used, for instance should the pattern element B be fine in mesh or weave, then the metal foil sheets A should be correspondingly thin in order that they will absorb the pattern from the pattern element through the body of the metal foil to the outer surface when the sandwich is subjected to pressure and heat. Should the pattern transferring element B be coarse, then the metal foil sheets A should be correspondingly thicker in order that there will be enough metallic body to absorb and transfer the pattern without the element B breaking through the metal foil body. It will be realized that, under pressure, the metal foil sheets A and the pattern element B will mould together and that the thickness of the metal foil sheet will determine the degree of coarseness or fineness of the resulting pattern on the outer surface of the sandwich. Not only can there be great variation in the selection of the pattern by using either wire screens or textile fabrics but there is also wide variation in the depth of pattern by reason of the thickness of the sandwiching metal foil sheets.

In order that the embossing plate or sandwich will remain stable, the edges can be either stitched or stapled at C, or alternatively they can be sealed by passing the edges of the sandwich under high pressure rolls.

Figure 1:
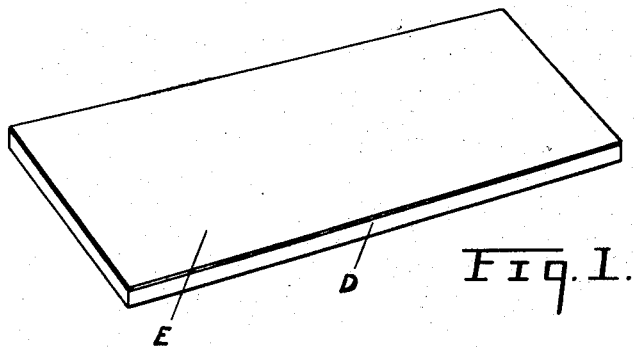
Fig. 1 is a perspective view of a finished laminated sheet.
Figure 2:
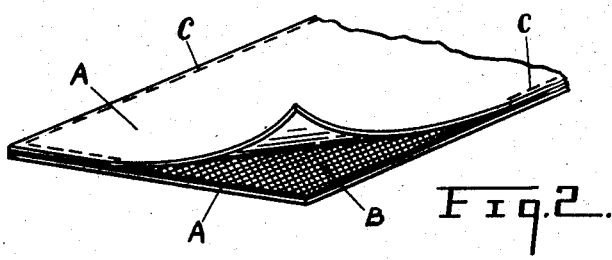
Fig. 2 is a perspective view of a pattern sandwich having one corner of the top surface turned up to expose the pattern transferring element.
Figure 3:
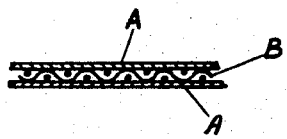
Fig. 3 is a partial enlarged section of the sandwich and showing a wire screen pattern element as the insert.
Figure 4:
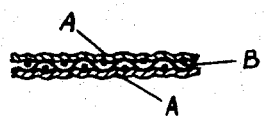
Fig. 4 is a section similar to Fig. 3 but showing the sandwich compressed after first use.
Figure 5:
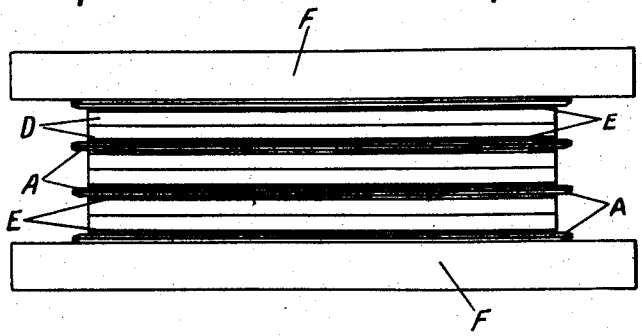
Fig. 5 is a diagrammatic sectional view showing the assembly of the sandwiches and panels to be patterned in a press.

The sandwich is made slightly larger all round than the boards or panels D whose plastic finish laminate E is to be patterned so that when the boards or panels D are assembled between the platens F of the press as shown in Fig. 5 the panel surfaces E will not be marred by the stitching or finishing of the edges of the sandwich.

In the use of these embossing plates or sandwiches, it is not necessary to complete the process of bringing the pattern out to the surface prior to their use in transferring the pattern to the boards or panels D, that part of the operation will be accomplished in the processing of the first batch of panels.

The resulting pattern transferred to the plastic surface laminate has a smooth and pleasing appearance due to the absorption by the aluminum of any roughness which may be present in the pattern element B and is far ahead of any texture which could be imparted by a steel platen and at far less cost.

The resulting sandwiches are homogeneous in that the metal foil sheets and the pattern material are intimately moulded together, and as they are light in weight as compared with ordinary steel platens, they can be conveniently stored for future use with only the necessary precaution to preserve the surface from damage.

In the use of this invention, the prepared sheets of material suitably impregnated with the desired bonding material and surfaced with a decorative resin impregnated sheet, are assembled in a quantity which will, after treatment in a press, produce a board or panel of the desired thickness. These assemblies are then piled up on the base of the press, usually back to back with an embossing plate or sandwich as above described, inserted between the facing plastic laminate surfaces. The whole assembly is then subjected to high pressure and heat for the required length of time to effect a complete bond and curing of the boards or panels and, in the process the pattern of the embossing plate or sandwich will be transferred to the adjacent surface of the plastic laminate. The sheets are then removed from the press and the embossing plates are stored for future use.

What I claim is:

A method of forming embossing plates and surface-finishing stacked sheets of plastic material which comprises inserting between individual sheets of plastic material a surface-finishing embossing plate comprising a sheet of reticulated woven material sandwiched and sealed between carrying sheets of thin metal foil and subjecting the resulting assembly to heat and pressure to effect a permanent bonding of the thin metal foil sheets with the woven material and a transfer of the pattern of the woven material to the surface of the thin metal foil sheets and to the surface of the adjacent sheets of plastic material, separating the sheets of plastic material from the embossing plate comprising bonded sheets of thin metal foil and woven material, and thereafter using said embossing plate to surface-finish other sheets of plastic material.

References Cited in the file of this patent

UNITED STATES PATENTS

| | | |
|---|---|---|
| 2,070,023 | Olsen | Feb. 9, 1937 |
| 2,338,091 | Brennan et al. | Jan. 4, 1944 |
| 2,510,999 | Oldofredi | June 13, 1950 |
| 2,517,698 | Muskat | Aug. 8, 1950 |
| 2,549,847 | Oldofredi | Apr. 24, 1951 |
| 2,606,855 | Jenkins | Aug. 12, 1952 |